United States Patent [19]

Kaneishi et al.

[11] Patent Number: 5,417,560
[45] Date of Patent: May 23, 1995

[54] DRIVE APPARATUS FOR DRIVING MOVABLE MEMBER IN PLASTIC MOLDING DIE APPARATUS

[75] Inventors: Akimasa Kaneishi, Hiratsuka; Tetsuya Hozumi, Nihonmatsu, both of Japan

[73] Assignees: Mitsubishi Gas Chemical Company, Inc.; Plastron Corporation, Fukushima, both of Japan

[21] Appl. No.: 112,453

[22] Filed: Aug. 27, 1993

[30] Foreign Application Priority Data

Sep. 9, 1992 [JP] Japan ................. 4-266583

[51] Int. Cl.⁶ ............................. B29C 49/06
[52] U.S. Cl. ................. 425/192 R; 264/572; 425/533; 425/535; 425/546
[58] Field of Search .......... 425/533, 535, 546, 190, 425/192 R, 556; 264/572, 574

[56] References Cited

U.S. PATENT DOCUMENTS

| | | | |
|---|---|---|---|
| 4,740,150 | 4/1988 | Sayer | 264/572 X |
| 4,781,554 | 11/1988 | Hendry | 264/572 X |
| 4,797,236 | 1/1989 | Kojima | 425/546 X |
| 4,824,732 | 4/1989 | Hendry et al. | 425/546 X |
| 5,151,278 | 9/1992 | Baxi et al. | 264/572 X |
| 5,281,127 | 1/1994 | Ramsey | 425/556 |

FOREIGN PATENT DOCUMENTS 0283207 9/1988 European Pat. Off. .
59-91041 5/1984 Japan ................. 425/546
64-14012 1/1989 Japan .

*Primary Examiner*—Richard L. Chiesa
*Attorney, Agent, or Firm*—Spencer, Frank & Schneider

[57] ABSTRACT

A drive apparatus for driving a movable member of a plastic molding die apparatus is provided which drives and controls a movable shaft for holding a gas injection nozzle by using a plurality of cylinders so that the gas injection nozzle of the die apparatus for use in a gas injection molding method can easily be changed. Resin is supplied from a position through a second die into a cavity formed between a first die and the second die, the drive apparatus disposed adjacent to the first die is used to drive the movable shaft for holding the nozzle of a gas supply means to supply gas into the resin in the cavity so that a hollow product is molded. The nozzle of the gas supply means is disposed at the leading portion of the hollow movable shaft. The drive apparatus includes a plurality of cylinders which are disposed at fixed positions adjacent to the first die with respect to the movable shaft and which are substantially the same, a connection plate for establishing the connections among rods of the plurality of fluid cylinders and the movable shaft, and a fluid control source for simultaneously driving the plurality of cylinders. The rod of each fluid cylinder and the connection plate are connected to each other while having plays in the axial direction and the radial direction.

6 Claims, 6 Drawing Sheets

FIG. I
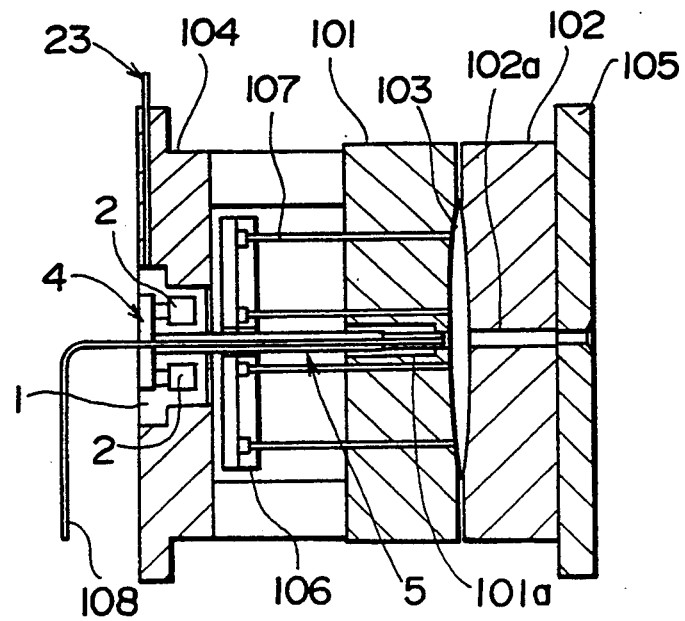
FIG. 2
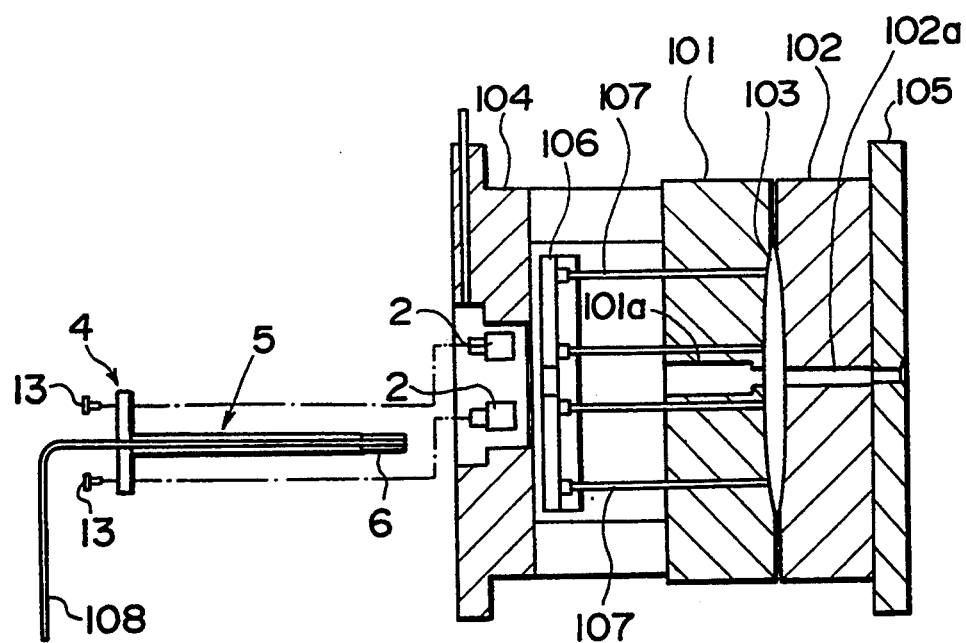

DRIVE APPARATUS FOR DRIVING MOVABLE MEMBER IN PLASTIC MOLDING DIE APPARATUS

BACKGROUND OF THE INVENTION

1. Field of the Invention

The present invention relates to a drive apparatus for driving a gas injection nozzle for a plastic molding die apparatus. The die apparatus has a die that is movable with an external operation and is preferably, for example, a plastic molding die apparatus adaptable to gas injection molding to form a hollow portion in a molded product.

2. Description of the Prior Art

A conventional gas injection molding method uses a gas injection nozzle for introducing gas into resin enclosed in a die cavity space.

The injection molding apparatus disclosed in Japanese Patent Appln. Laid-Open No. 64-14012 has a reciprocating gas injection nozzle.

FIG. 6 is a cross sectional view of the foregoing injection molding apparatus. FIG. 7 is an enlarged cross sectional view of the gas injection nozzle of the foregoing conventional structure.

Referring to FIGS. 6 and 7, reference numerals 210 and 214 respectively represent upper and lower platens, and 211 and 212 represent upper and lower dies. Reference numerals 213 and 216 represent surfaces of the upper and the lower dies 211 and 212 respectively. Reference numeral 219 represents resin injected into the cavity, and 225 represents a space formed in a molded product after the gas has been injected.

The foregoing apparatus includes a single-shaft fluid cylinder 227, disposed adjacent to lower die 212, to move a gas injection nozzle 226 having a center hole 228 therein. As shown in FIG. 7, gas injection nozzle 226 has a cap portion 232 at a leading portion thereof. A ball is inserted into cap portion 232, forming a check valve 230. Gas injection nozzle 226 is directly connected to a piston 229 of the fluid cylinder 227. The fluid cylinder 227 is secured to the lower die 212. Therefore, to inspect cap portion 232, for example for maintenance, the fluid cylinder 227 must be removed. Since a gas supply pipe 238 is positioned outside the fluid cylinder 227, as shown in FIG. 6, a space for the piping and wiring must be created by cutting the die 212.

If the fluid cylinder 227 is fastened adjacent to the lower die 212 as described above, a die fastening plate 251, an ejector plate and an ejector pin (omitted from the illustration) must be removed to attach/detach the gas injection nozzle 226. Therefore, the attachment and detachment of the gas injector nozzle can require excessive time and labor.

Further, the fluid cylinder 227, adjacent to the lower die 212, is located at an intermediate position between the die ejector and the product cavity. Thus, it is difficult to design and locate the ejector pins, required to eject a molded product, for the area in which the fluid cylinder is located.

SUMMARY OF THE INVENTION

An object of the present invention is to provide in a plastic molding die apparatus a drive apparatus for driving a movable member.

Another object of the present invention is to provide in a plastic molding die apparatus a drive apparatus for driving a movable member, the drive apparatus including a plurality of cylinders to control the movement of a movable shaft member that holds a gas injection nozzle, so that the problems experienced with the foregoing conventional gas injection molding method are overcome.

In order to achieve the foregoing objects, a drive apparatus for driving a movable member in a plastic molding die apparatus according to the present invention comprises:

a movable member having a movable shaft which moves in the die apparatus;

a plurality of substantially identical fluid cylinders which are symmetrically positioned in the plastic molding die apparatus around a movement axis of the movable shaft;

a connection plate for establishing the connections among a respective rod of each of fluid cylinder and the movable shaft; and fluid control means for driving the plurality of cylinders, wherein a connection portion, in which the rods of the fluid cylinders and the connection plate are connected, has predetermined plays in an axial direction and a radial direction.

A drive apparatus according to the present invention for driving a movable member having a movable shaft and disposed in a plastic molding die apparatus, the molding die apparatus being arranged such that resin is supplied into a cavity formed in a first die and a second die, and the drive apparatus provided for either of the dies is used to drive the movable shaft having a nozzle of gas supply means so that gas is supplied into the resin in the cavity and, accordingly, a hollow product is molded, the drive apparatus for driving the movable shaft comprising:

a plurality of fluid cylinders which are disposed at fixed positions adjacent to the first or second die with respect to the movable shaft and which are substantially the same; and a connection plate for establishing the connections among rods of the plurality of fluid cylinders and the movable shaft, wherein a connection portion, in which the rods of the fluid cylinders and the connection plate are connected, has predetermined plays in an axial direction and a radial direction.

The plurality of cylinders of the drive apparatus are fastened to a die fastening plate adjacent to the first or second die, and the movable shaft and the gas injection nozzle can be attached/detached together with the connection plate to and from the die fastening plate, while eliminating a need to disassemble the molding die apparatus.

The movable shaft is formed into a hollow structure so that pipes and wires can be secured thereto.

Other and further objects, features and advantages of the invention will be apparent from the following description.

BRIEF DESCRIPTION OF THE DRAWINGS

FIG. 1 is an arbitrary cross-sectional view of an embodiment of a plastic molding die apparatus using a drive apparatus according to the present invention;

FIG. 2 is a schematic view of the plastic molding die apparatus according to the present invention from which a connection plate and a movable shaft for supporting a gas injection nozzle are removed;

DESCRIPTION OF THE PREFERRED EMBODIMENTS

A drive apparatus for driving a movable member in a plastic molding die apparatus according to the present invention will now be described in further detail with reference to the drawings which illustrate an embodiment.

FIG. 1 is a schematic cross-sectional view of a plastic molding die apparatus using the drive apparatus according to the present invention. FIG. 2 is a schematic cross-sectional view where a movable shaft for supporting a gas injection nozzle is removed from the plastic molding die apparatus.

Figure 3:
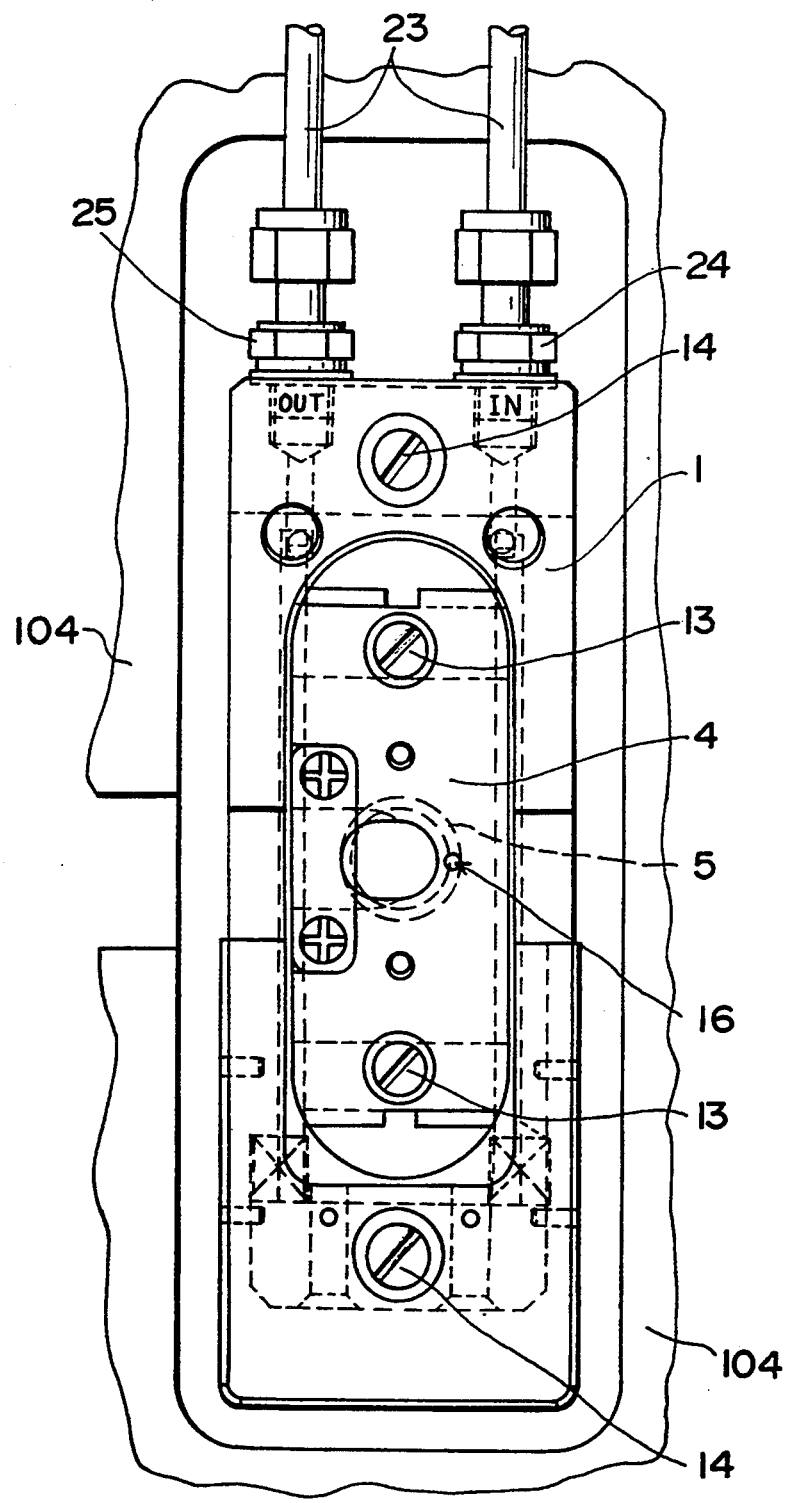
FIG. 3 is a plan view of a cylinder housing portion and a drive portion of the plastic molding die apparatus according to the present invention.
Figure 4:
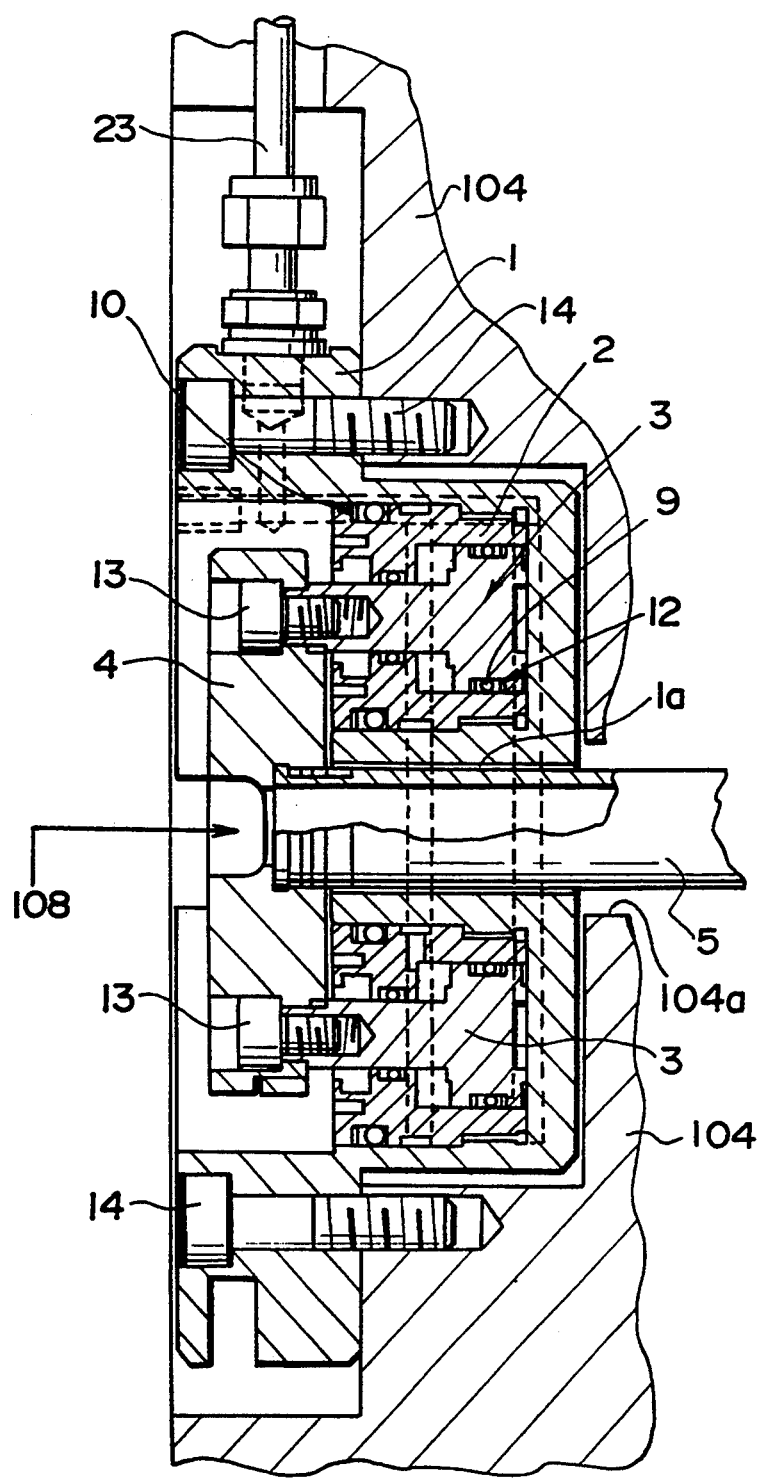
FIG. 4 is a cross-sectional view of the cylinder housing portion.

FIG. 3 is a side-elevational view of a connection plate for establishing the connection between the movable shaft and cylinders. FIG. 3 further illustrates a die fastening plate. FIG. 4 is a cross-sectional view of the connection plate and the die fastening plate.

As shown in FIGS. 1 and 2, the plastic molding die apparatus using the drive apparatus according to the present invention comprises a die fastening plate 104, an ejector plate 106 for supporting a plurality of ejector pins, a first die 101, a second die 102 and a die fastening plate 105 respectively positioned sequentially when viewed from a left position.

Resin for molding is injected through second die 102 and into a cavity 103. Cavity 103 is formed by the first and the second dies 101 and 102. Gas for forming a hollow portion is injected through the gas injection nozzle 6 during the injection of the resin.

As shown in FIGS. 3 and 4, a cylinder housing 1 is secured to the die fastening plate 104 by screws 14. A through hole 1a is formed at the central portion of the cylinder housing 1. The cylinder housing 1 has two holes formed symmetrically to each other with respect to the center axis of the hole 1a. A hydraulic cylinder body 2 is embedded in each of the foregoing two holes. Each hydraulic cylinder body 2 includes a corresponding piston 3 sliding therein and forming a hydraulic actuator.

Each piston 3 of has a rod 3a connected to the connection plate 4 which, as will be explained establishes a connection to the movable shaft 5. That is, the leading portions of the pistons 3 are introduced into the connection plate 4 and fastened by screws 13.

Figure 5:
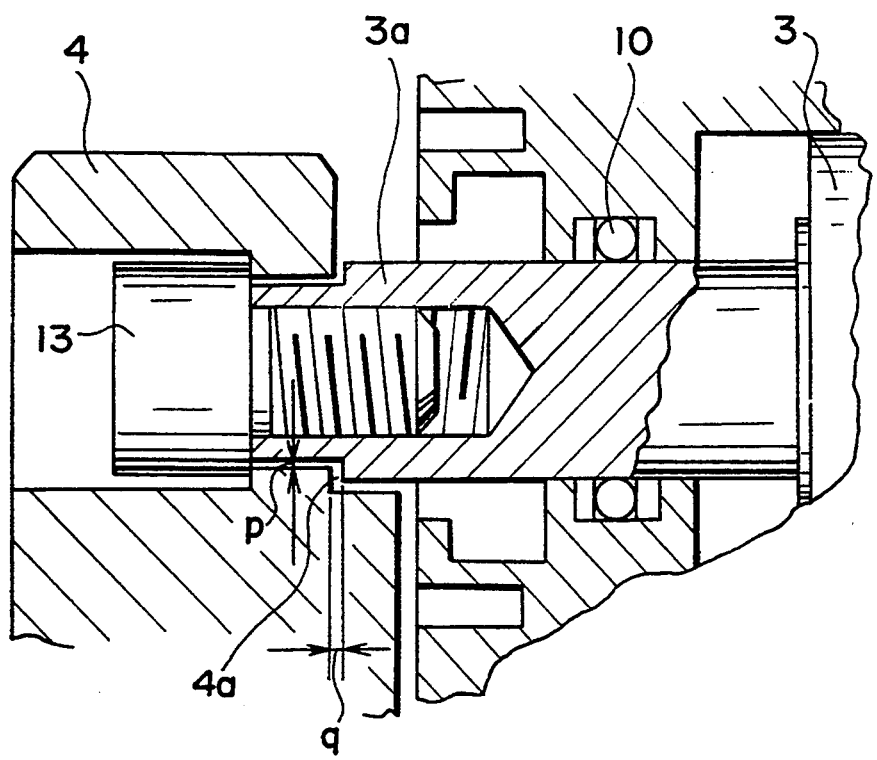
FIG. 5 is an enlarged cross-sectional view of a connection portion having a rod of a fluid cylinder and the connection plate connected to each other.
Figure 6:
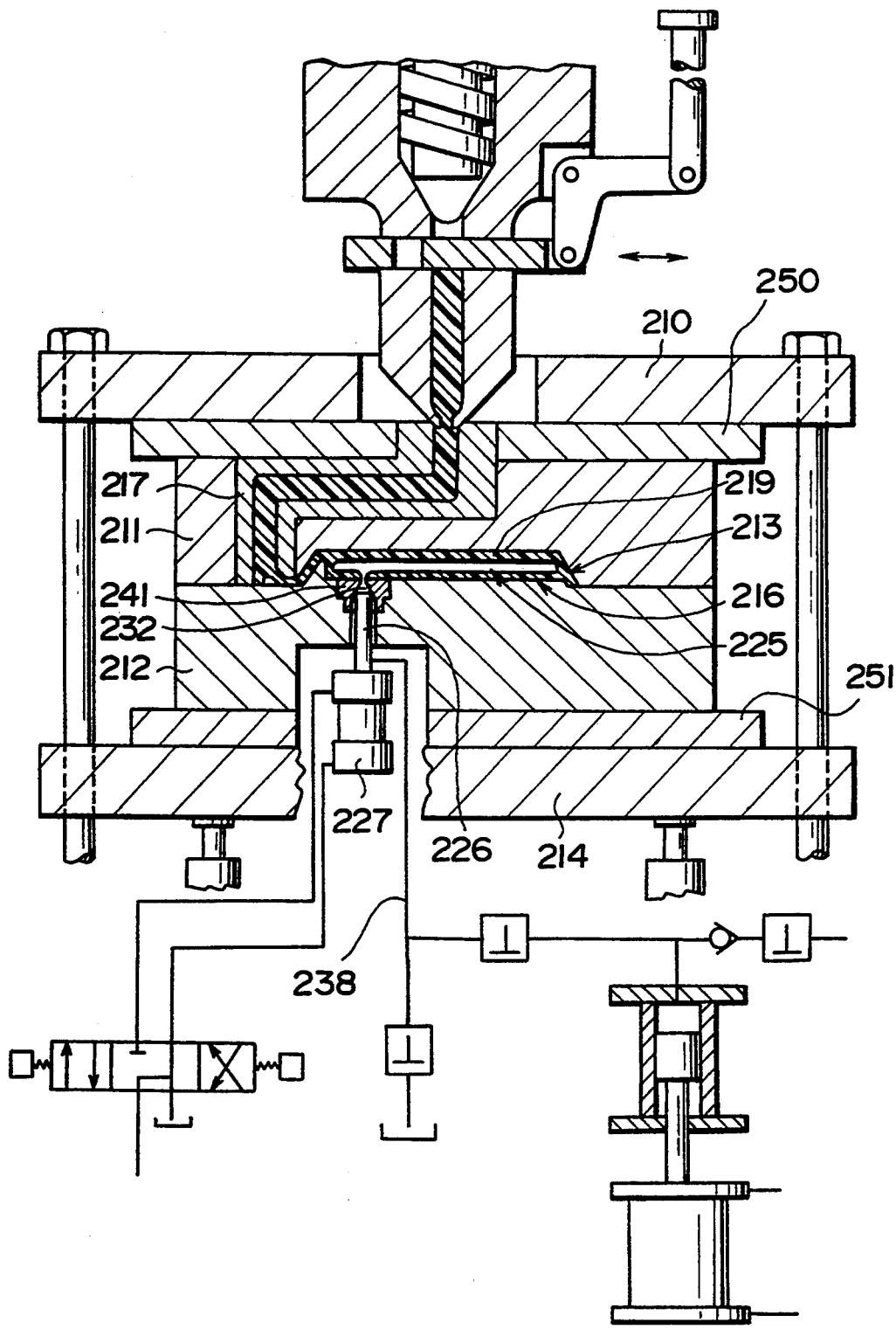
FIG. 6 is a cross-sectional view of a conventional plastic molding die apparatus using a gas injection method.
Figure 7:
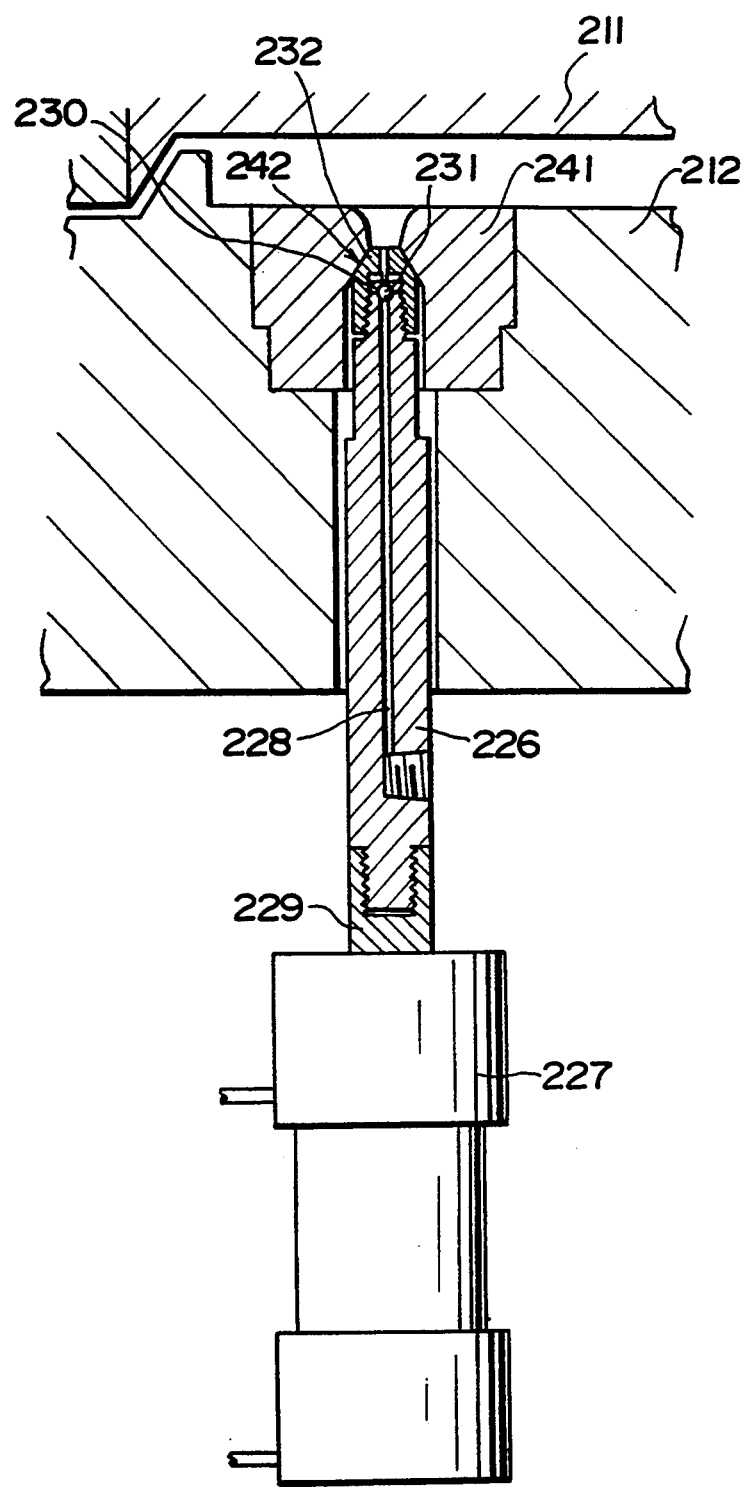
FIG. 7 is an enlarged cross-sectional view of a gas injection nozzle of the conventional example.

FIG. 5 is an enlarged view of a connection portion comprising the connection between the connection plate 4 and rod 3a. FIG. 5 illustrates piston rod 3a moved to the rightmost side in the figure, creating axial-directional clearance q between a portion 4a of the connection plate 4 and a shoulder of the piston rod 3a. Clearance p is "likewise" created in a radial direction.

"O" rings 9 and 10 are disposed between the hydraulic cylinder bodies 2 and the pistons 3. The connection plate 4 has a threaded hole at the central portion thereof. The pipe-like movable shaft 5 is screwed and fixed to the threaded hole. The movable shaft 5 passes through the through hole 1a and through a central hole 101a formed in the first die 101 so that the leading portion (nozzle 6) of the movable shaft 5 is introduced into the cavity 103. The central portion of the movable shaft 5 passes through each of through hole 1a (see FIG. 4), a through hole 104a formed in the die fastening plate 104 which supports the cylinder housing, a hole formed in the ejector plate 106, and the central hole 101a formed in the first die 101. The outer diameter of the movable shaft 5 is sufficiently smaller than the inner diameter of each of the foregoing through-holes so that proper clearances are formed to prevent unnecessary friction. The movable shaft 5 is hollow so that a high-pressure gas introduction pipe 108 and any required wires can be secured therein. Further, the leading portion of the pipe 108 is connected to the nozzle 6. It should be noted that the present invention may be arranged such that the leading portion and nozzle 6 can form a valve structure which is similar to that of the foregoing conventional apparatus.

The two cylinder pistons 3 are simultaneously operated by one fluid control system.

Fluid pipes 23 forming a portion of the fluid control system are connected to the fluid cylinder via an in-port 24 and an out-port 25 formed in the cylinder housing 1. The fluid pipes 23 are connected to a fluid pressure source (omitted from illustration).

When the two cylinder pistons 3 have been moved to the left portion of FIG. 4 by operating the fluid pressure source, the connection plate 4 and the movable shaft 5 are integrally moved. As a result, the nozzle 6 is moved in a direction away from the cavity 103. When the cylinder pistons 3 are moved to the right portion of FIG. 4, the nozzle 6 is moved and brought into contact and connected to the cavity 103.

As described above, an end portion of the movable shaft 5 is threaded into the central hole formed in the connection plate 4, and fixed by a set screw 16. To remove the connection plate 4 from the two cylinder pistons 3, the screws 13 are loosened (as shown in FIG. 2) the integrated body comprising connection plate 4 and the movable shaft 5 can be disconnected.

The ejector plate 106 has four ejector pins 107. The ejector pins 107 are positioned to correspond to the holes formed in the first die 101. The leading portions of the ejector pins face the cavity 103.

As described above, the plastic molding die apparatus using the drive apparatus according to the present invention has the cylinders positioned around a movable shaft and connected by the connection member. Therefore, the movable shaft is moved then the pistons are moved.

Therefore, the overall size of the apparatus can be reduced. Preferably, the connection portions, that is, the areas in which the rods of the fluid cylinders and the connection plate are connected to each other, have predetermined plays in the axial and radial directions of the rods of the fluid cylinders.

Therefore, if a slight operation error occurs between the fluid cylinders, generation of unnecessary restriction in the connection portion (i.e., where the pistons and the connection plate are connected to each other) is prevented. As a result, a smooth operation can be obtained without requiring a cylinder synchronizing apparatus and precise guide members.

Prior to the present invention, if a plurality of cylinders were used, a complicated synchronizing apparatus and the like must likewise be used. However, the foregoing structure according to the present invention eliminates the necessity of using the foregoing synchronizing apparatus.

Preferably, the movable shaft can be removed by removing the two bolts 13 so that the die does not need to be disassembled. As a result, the gas injection pipe and the gas injection nozzle and the like can easily be fastened/removed.

Since the size of the movable shaft 5 is sufficiently small compared with the size of the cylinder housing, the ejector pins can be more densely positioned as compared with the conventional apparatus.

If the output force from the cylinder is large, three or more cylinders may be positioned at the apexes of an equilateral triangle, a square or a regular polygon, the center of each being the movable shaft 5.

Although the description has been made with respect to the gas injection molding method, the apparatus according to the present invention may also be used, for example, to control the core in a cavity.

Although the foregoing embodiment has the drive apparatus fastened to the die fastening plate, the position to which the drive apparatus is fastened is not limited to the die fastening plate. The drive apparatus may be positioned at an arbitrary position in the die.

Although the invention has been described in its preferred form with a certain degree of particularity, it is understood that the present disclosure of the preferred form has been changed in the details of construction, and the combination and arrangement of parts may be changed without departing from the spirit and the scope of the invention as hereinafter claimed.

What is claimed is:

1. A drive apparatus for driving a movable member having a movable shaft positioned in a plastic molding die apparatus, said molding die apparatus including a first die and a second die forming a cavity, said molding die apparatus being arranged such that resin is supplied into said cavity formed in said first die and said second die, and said drive apparatus provided for either of said dies is used to drive said movable shaft having a nozzle for supplying gas into said resin in said cavity and, accordingly, a hollow product is molded, said movable shaft being located within either one of said first and said second dies and having said nozzle attached thereto, said drive apparatus for driving said movable shaft comprising:

a plurality of fluid cylinders which are positioned at fixed positions adjacent one of said first and second dies with respect to said movable shaft and which are substantially the same, each said fluid cylinder having a rod; and a connection plate having said rods and said movable shaft connected thereto, each respective rod and connection plate connection having a predetermined axial and radial clearance.

2. A drive apparatus for driving a movable member in a plastic molding die apparatus according to claim 1, wherein said plurality of cylinders of said drive apparatus are fastened to a die fastening plate adjacent to said first or second die, and having means for attaching and detaching said movable shaft and said gas injection nozzle together with said connection plate to and from said die fastening plate thereby eliminating a necessity of disassembling said molding die apparatus.

3. A drive apparatus for driving a movable shaft in a plastic molding die apparatus according to claim 1, wherein said movable shaft is formed into a hollow structure including pipes and wires secured thereto.

4. A drive located in a plastic molding die apparatus, the plastic molding die apparatus including first and second die portions forming a cavity for injected resin, the drive comprising:

a movable shaft located within one of the die portions and having a nozzle attached thereto;

gas supply means for supplying gas through said nozzle and into the cavity;

a plurality of substantially identical fluid cylinders fixedly positioned adjacent to the one die portion, each said fluid cylinder having a piston rod; and a connection plate having said piston rods and said shaft connected thereto, said piston rod and said connection plate connection having a predetermined axial and radial clearance formed therebetween.

5. A drive apparatus as defined in claim 4, the plastic molding die apparatus including a die fastening plate adjacent to the one die portion and having said fluid cylinders fastened thereto, said drive apparatus further comprising means for attaching and detaching said movable shaft, said nozzle, and said connection plate as a unit to said die fastening plate, thereby eliminating the need to disassemble the plastic molding die apparatus.

6. A drive apparatus as defined in claim 4, wherein said movable shaft is hollow.

* * * * *